(12) United States Patent
Chen et al.

(10) Patent No.: US 11,188,851 B2
(45) Date of Patent: Nov. 30, 2021

(54) PRIORITY SEATING MANAGEMENT IN PUBLIC/PRIVATE TRANSPORTATION

(71) Applicant: International Business Machines Corporation, Armonk, NY (US)

(72) Inventors: Sue Ann Chen, Melbourne (AU); Arun Vishwanath, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 471 days.

(21) Appl. No.: 15/401,937

(22) Filed: Jan. 9, 2017

(65) Prior Publication Data
US 2018/0197114 A1    Jul. 12, 2018

(51) Int. Cl.
*G06Q 10/02* (2012.01)
*H04L 29/08* (2006.01)

(52) U.S. Cl.
CPC .............. *G06Q 10/02* (2013.01); *H04L 67/18* (2013.01); *H04L 67/12* (2013.01)

(58) Field of Classification Search
CPC ........ G06Q 10/02; G06Q 10/04; H04L 67/10; G01C 21/3438
USPC ................ 705/5, 6, 26.1; 382/118; 701/532; 340/905, 921; 235/382
See application file for complete search history.

(56) References Cited

U.S. PATENT DOCUMENTS

| | | | | |
|---|---|---|---|---|
| 8,472,417 B2* | 6/2013 | Gabel | .................... | G07C 5/008 370/338 |
| 8,903,393 B2* | 12/2014 | Payyappilly | .......... | H04W 36/26 455/436 |
| 10,320,923 B2* | 6/2019 | Moghe | ............ | H04W 36/00835 |
| 2005/0288973 A1* | 12/2005 | Taylor | .................... | G06Q 10/02 705/5 |
| 2007/0143153 A1* | 6/2007 | Ashby | .................... | G06Q 10/02 705/5 |
| 2007/0250356 A1 | 10/2007 | Douglas | | |
| 2007/0290554 A1* | 12/2007 | Teshima | ............... | B60N 2/0248 307/10.1 |
| 2009/0271227 A1* | 10/2009 | Hayat | .................... | G06Q 10/02 705/6 |
| 2009/0326990 A1* | 12/2009 | Ashby | .................... | G06Q 10/02 705/5 |

(Continued)

OTHER PUBLICATIONS

Mel, et al. "The NIST Definition of Cloud Computing". Recommendations of the National Institute of Standards and Technology. Nov. 16, 2015.

*Primary Examiner* — Vanel Frenel
(74) *Attorney, Agent, or Firm* — Joseph Petrokaitis; McGinn I.P. Law Group, PLLC.

(57) ABSTRACT

A priority seating management method, system, and computer program product, includes obtaining user trip data including a current location and a trip destination for a trip of a user, retrieving potential route data from a transportation database for each transportation vehicle traveling a route between the current location and the trip destination, retrieving real-time priority seating occupancy information for each transportation vehicle traveling the route including a location of a priority seat and an occupancy type of the priority seat, and compiling the user trip data, the potential route data, and the real-time priority seating occupancy information to determine a status availability of the priority seat for the user.

19 Claims, 8 Drawing Sheets

(56) References Cited

U.S. PATENT DOCUMENTS

| | | | |
|---|---|---|---|
| 2010/0017215 A1* | 1/2010 | Nigam | G07C 9/00 705/1.1 |
| 2010/0244513 A1* | 9/2010 | Fukui | B60N 2/161 297/217.1 |
| 2011/0225188 A1* | 9/2011 | Lopinto | G06Q 50/14 707/770 |
| 2011/0278884 A1 | 11/2011 | Marchesi | |
| 2012/0010913 A1* | 1/2012 | Lele | G06Q 10/02 705/5 |
| 2012/0048998 A1* | 3/2012 | Schliwa | B64D 11/02 244/118.6 |
| 2012/0106801 A1* | 5/2012 | Jackson | G08G 1/205 382/105 |
| 2012/0310680 A1* | 12/2012 | Bourla | G06Q 10/04 705/5 |
| 2013/0054279 A1* | 2/2013 | Sharp | G06Q 10/02 705/5 |
| 2013/0117057 A1* | 5/2013 | Van Moltke | G06Q 10/025 705/7.13 |
| 2014/0052482 A1* | 2/2014 | Le Marier | G06Q 10/02 705/5 |
| 2014/0195282 A1* | 7/2014 | Stefik | G06Q 10/02 705/5 |
| 2015/0185030 A1* | 7/2015 | Monroe | G01C 21/3438 701/532 |
| 2015/0228004 A1* | 8/2015 | Bednarek | G06Q 10/08355 705/26.8 |
| 2016/0347209 A1* | 12/2016 | Pluta | F16C 1/22 |
| 2017/0200355 A1 | 7/2017 | Gruenbaum | |
| 2018/0039917 A1* | 2/2018 | Buttolo | G06Q 10/0631 |
| 2018/0040163 A1* | 2/2018 | Donnelly | G06F 3/017 |

* cited by examiner

PRIORITY SEATING MANAGEMENT IN PUBLIC/PRIVATE TRANSPORTATION

BACKGROUND

The present invention relates generally to a priority seating management method, and more particularly, but not by way of limitation, to a system, method, and computer program product for determining a status of a passenger currently occupying a priority seat in order to manage the occupancy of a seat for a disabled passenger (i.e., special needs passenger).

Public (and private commercial) transportation usage has been increasing in recent years and is further expected to grow due to urbanization, economic and environmental concerns. In spite of this, the number of priority seats within these vehicles remains relatively unchanged from before. The sparse location of priority seats within public vehicles in addition to the lack of priority seat occupancy information within the carriages further encumber passengers in need of such seats or one section of a car, or are poorly marked, etc.

Typically, passengers occupy any available seat on the vehicle and disregard if a seat is intended for a disabled passenger. In addition, the priority seats can be difficult to locate (e.g. when priority seats are only located on one car of a train and it's not clear in which car).

SUMMARY

In an exemplary embodiment, the present invention can provide a computer-implemented priority seating management method, the method including obtaining user trip data including a current location and a trip destination for a trip of a user, retrieving potential route data from a transportation (e.g., public or private) database for each transportation vehicle traveling a route between the current location and the trip destination, retrieving real-time priority seating occupancy information for each transportation vehicle traveling the route including a location of a priority seat and an occupancy type of the priority seat, and compiling the user trip data, the potential route data, and the real-time priority seating occupancy information to determine a status availability of the priority seat for the user.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-7, in which like reference numerals refer to like parts throughout. It is emphasized that, according to common practice, the various features of the drawing are not necessarily to scale. On the contrary, the dimensions of the various features can be arbitrarily expanded or reduced for clarity.

Figure 1:
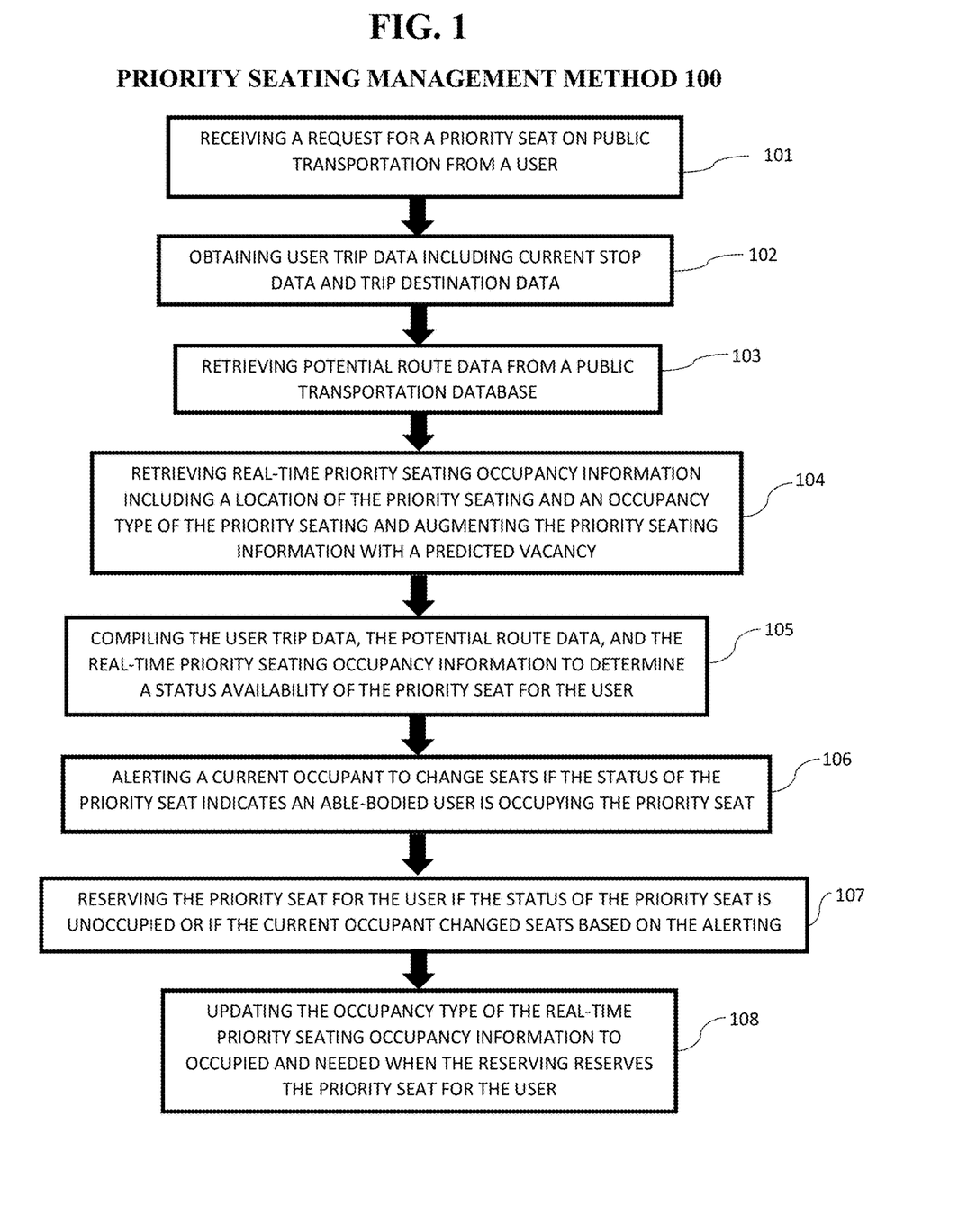
FIG. 1 exemplarily shows a high-level flow chart for a priority seating management method 100 according to an embodiment of the present invention.

By way of introduction of the example depicted in FIG. 1, an embodiment of a priority seating management method 100 according to the present invention can include various steps for providing advice to or creating reservations for commuters requiring priority seats by leveraging image analytics (i.e., image streams to determine priority seat occupancy), collecting and collating data from Internet-of-Things (IoT) sensors (i.e. pressure sensors within seats, cameras, etc.), and databases (i.e., user travel information, transportation (e.g., public or private) network information database, etc.). By way of introduction of the example depicted in FIG. 5, one or more computers of a computer system 12 according to an embodiment of the present invention can include a memory 28 having instructions stored in a storage system to perform the steps of FIG. 1.

Thus, a priority seating management method 100 according to an embodiment of the present invention may act in a more sophisticated, useful and cognitive manner, giving the impression of cognitive mental abilities and processes related to knowledge, attention, memory, judgment and evaluation, reasoning, and advanced computation. In other words, a "cognitive" system can be said to be one that possesses macro-scale properties—perception, goal-oriented behavior, learning/memory and actions generally recognized as cognitive.

Although one or more embodiments may be implemented in a cloud environment 50 (see e.g., FIG. 6), it is nonetheless understood that the present invention can be implemented outside of the cloud environment.

It is noted that "disabled passenger", "special needs passenger", "physically challenged", and "needy passenger" refer generally to a passenger that requires special seating accommodations on public transportation.

Referring now to FIG. 1, in step 101, a request for a priority seat on public transportation is received from a user. For example, a potential disabled passenger sends a request that they wish to travel on public transportation and require special seating (i.e., priority seating).

In step 102, based on the received request from the user, user trip data is obtained including current stop data and trip destination data. That is, current stop data can be obtained including information about the current location of the user, where they are located on a train platform, types of access to the public transportation, etc. and trip destination data includes where the user intends to travel.

In step 103, potential route data is retrieved from a public transportation database based on the user's current location and their end destination. In other words, each potential route and types of public transportation available from the current location to the end location is retrieved. For example, the types of trains or buses that can take a user from their current location to the end destination, can be retrieved.

In step 104, real-time priority seating occupancy information is retrieved for each of the public transportation vehicle that travels the route from the user's current location to the end destination. For example, if six different trains travel from the user's current location to the end destination, real-time priority seating occupancy information is retrieved for each of the trains such that the priority seating availability can be determined and the user can be advised which of the six trains to board (as described later). The real-time priority seating occupancy information includes a location of the priority seating (e.g., which train car of the train has the priority seating, which end of a bus the priority seating is located, etc.) and an occupancy type of the priority seating. It is noted that the occupancy type of the priority seating includes two types: an occupancy by a special needs passenger or an occupancy by an able-bodied passenger.

In step 104, real-time priority seat occupancy information (e.g., location, whether occupied by special needs passenger, etc.) is retrieved from, for example, occupancy analytics unit (from sensor data, image analytics, etc.), and augments it with predicted vacancy (from, for example, image analytics)

Further, in step 104, the real-time priority seating occupancy information is augmented such that a predicted vacancy of the priority seats can be obtained. That is, if the "occupancy type" of the priority seat on the train is returned as being occupied by a special needs passenger but the special needs passenger is leaving the train at the current stop (i.e., their end destination is the other user's current stop), the real-time priority seating occupancy information is augmented to include the predicted vacancy at the stop where the passenger currently occupying the seat will exit the train.

In step 105, the user trip data, the potential route data, and the real-time priority seating occupancy information is compiled to determine a status availability of the priority seat for the user. In other words, the current stop and trip destination of the user, the potential routes (and public transportation mediums for the routes) to the destination, and the availability of the priority seats on the public transportation of the routes is compiled and leveraged to determine which vehicle has an available priority seat for the user.

For example, if a train traveling a route from the current location of the user to the end destination of the user includes a priority seat that has a current occupancy of "occupied by a disabled passenger", the train is determined not to have an availability for the user since another special needs user already is occupying the seat.

It is noted that in the future, it could be envisioned that there may be a ranking of the neediness of special needs passengers. Thus, one special needs passenger may have a disability (e.g., deafness or the like) which for purposes of priority for a special needs seat may be lower than a special needs person who has no legs or is blind. Thus, special needs passengers could be prioritized with the higher-priority special needs passenger being given the special needs seat over the lower-priority special needs passenger.

Alternatively, if the other special needs user's final destination is the current location of the user, the status availability is open and the priority seat is reserved for the current user. Or, if the status availability indicates that an able-bodied user is currently occupying the priority seat, the status availability is open and a message is sent to the able-bodied user to find a different seat such that the seat is available for the disabled current user (as described later).

In step 106, a current occupant is alerted to change seats (e.g., vacate the priority seat) if the status availability in step 105 is determined that an able-bodied user (or lower priority special needs person) is occupying the priority seat. In other words, a message is sent to a person to find another seat if a person who does not require the accommodations of the priority seat is occupying the priority seat such that the disabled user can reserve the priority seat.

In step 107, the priority seat for the user is reserved if the status of the priority seat is "unoccupied", if the current occupant changed seats based on the alerting, and/or if the current disabled user occupant is exiting the public transportation vehicle at the current stop.

In step 108, the occupancy type of the real-time priority seating occupancy information is updated to "occupied and needed" when the seat is reserved for the user. That is, the real-time priority seating occupancy information is updated to note that the current user is occupying the priority seat from the current location to the trip destination.

Figure 2:
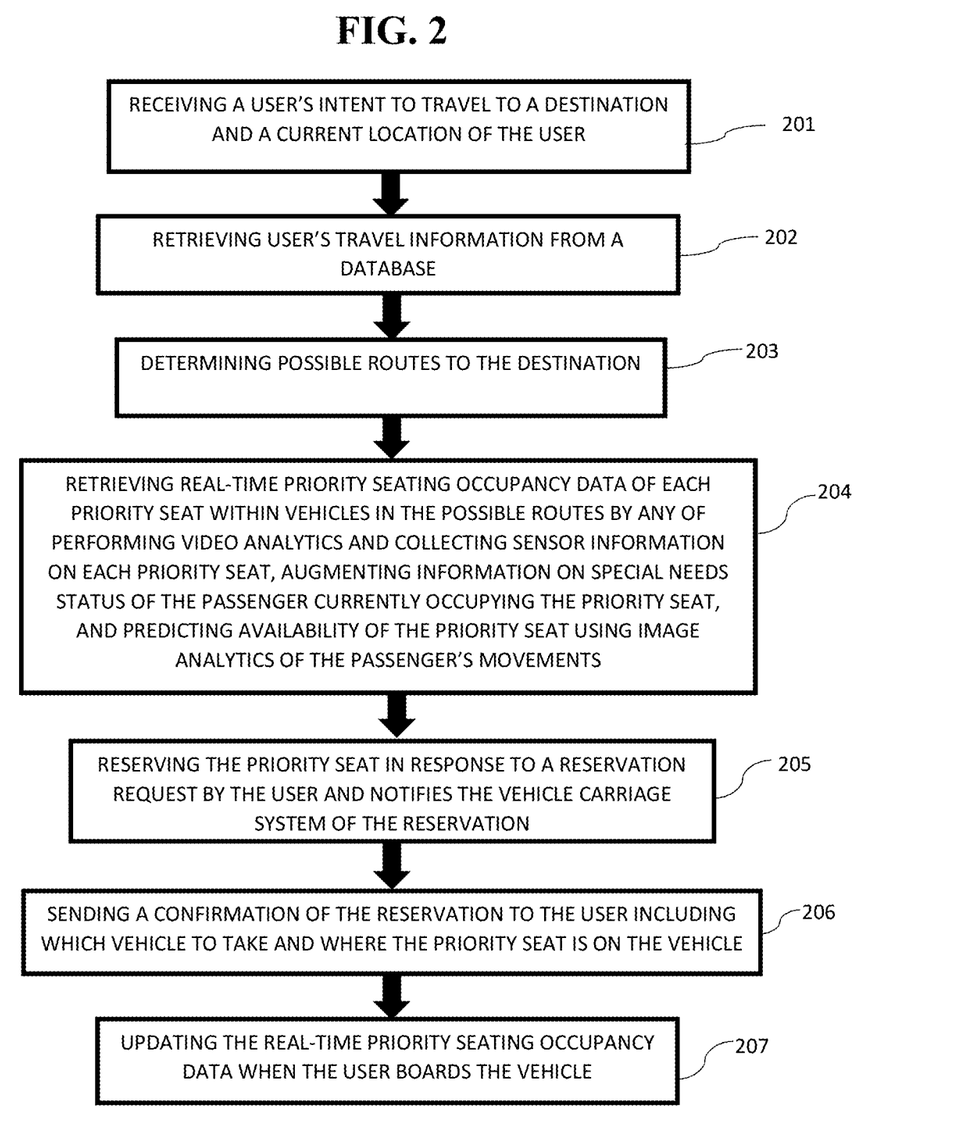
FIG. 2 exemplarily shows a high-level flow chart for an embodiment of the priority seating management method 100.
Figure 4:
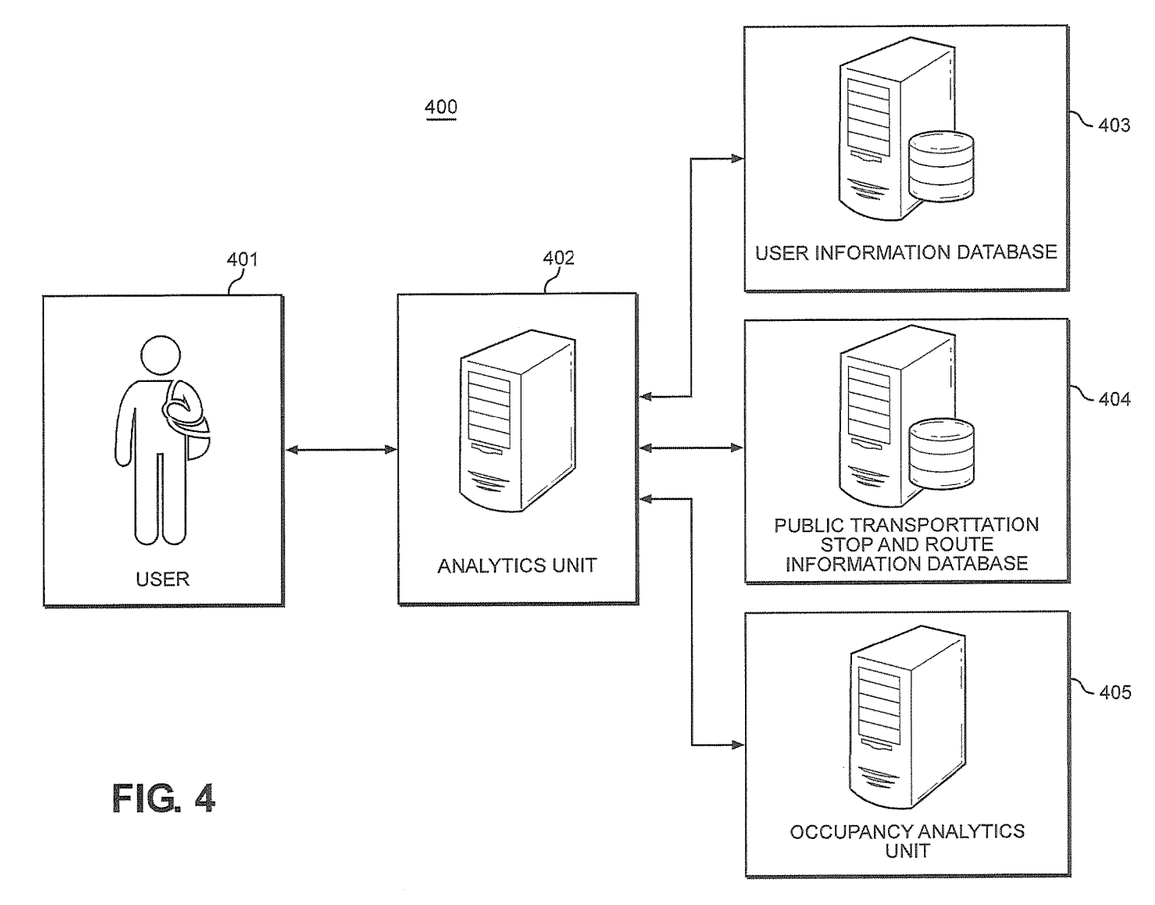
FIG. 4 exemplarily depicts an exemplary system 400 according to an embodiment of the present invention.

Referring now to FIGS. 2 and 4, FIG. 2 exemplarily depicts a flow chart of an exemplary embodiment for the method 100 and FIG. 4 exemplarily depicts a system 400 for executing the method 100.

In steps 201-203 and by the analytics unit 402, the user information database 403, and the public transportation stop and route information database 404, a user's intent to travel to a destination and the current location of the user are received, the user's travel information is retrieved from a database, and potential routes to the destination including which public transportation vehicles can travel to the routes are retrieved.

In step 204 and by the occupancy analytics unit 405, the real-time priority seating occupancy data of each priority seat within vehicles of the public transportation vehicles that can travel from the current location to the destination is retrieved by using, for example, video analytics and collecting sensor information on each priority seat (e.g., sensors, such as a pressure sensor, can be disposed within the seats and communicate occupancy over the cloud). That is, the occupancy of each priority seat on any of the vehicles that can travel to the desired destination of the user is retrieved. Further, the unit also determines whether priority seats are occupied by those in need of the seats via for e.g. detection of mobility aid, pregnancy, age, gait, etc. Finally, the unit also predicts availability of the priority seat using image analytics and passenger's movement or reservation types (e.g., end destination indicates availability) and the real-time priority seating occupancy data is augmented based on whether a special needs occupant (or in an alternative embodiment, a same or higher priority special needs passenger than that of the requestor) is currently occupying the seat.

In step 205 and by the analytics unit 404 receiving information from the occupancy analytics unit 405, the priority seat is reserved for the user in response to a reservation request by the user and notifies the vehicle (or computer-implemented method database) of the reservation.

In other words, in steps 201-205, a user can send a request for a priority seat by indicating their current location and their final destination. In response to the request, each public transportation vehicle traveling the route between the current location and the destination can be tracked to determine an occupancy status of each of its priority seats. Based on the occupancy status, the user can reserve a seat.

In step 206, a confirmation is sent to the user confirming the reservation. The confirmation can include which vehicle to take (e.g., typically trains or metros include several train cars—the confirmation can include which of the train cars to board and at which end/door of the car) and where the priority seat is on the vehicle (e.g., if priority seat is at front or back of a bus).

That is, in step 206, the user is directed how to board the public transportation vehicle in an optimal manner when the reservation is sent. Typically, disabled users cannot easily navigate a public transportation once they board the vehicle due to their limitations. Thus, directions on where to board and which train car to board greatly helps the disabled user quickly arrive at their priority seat. Also, this effect can speed up the overall efficiency of public transportation by having disabled passengers more quickly take their seats.

In step 207, the real-time priority seating occupancy data is updated when the user boards the vehicle.

Figure 3:
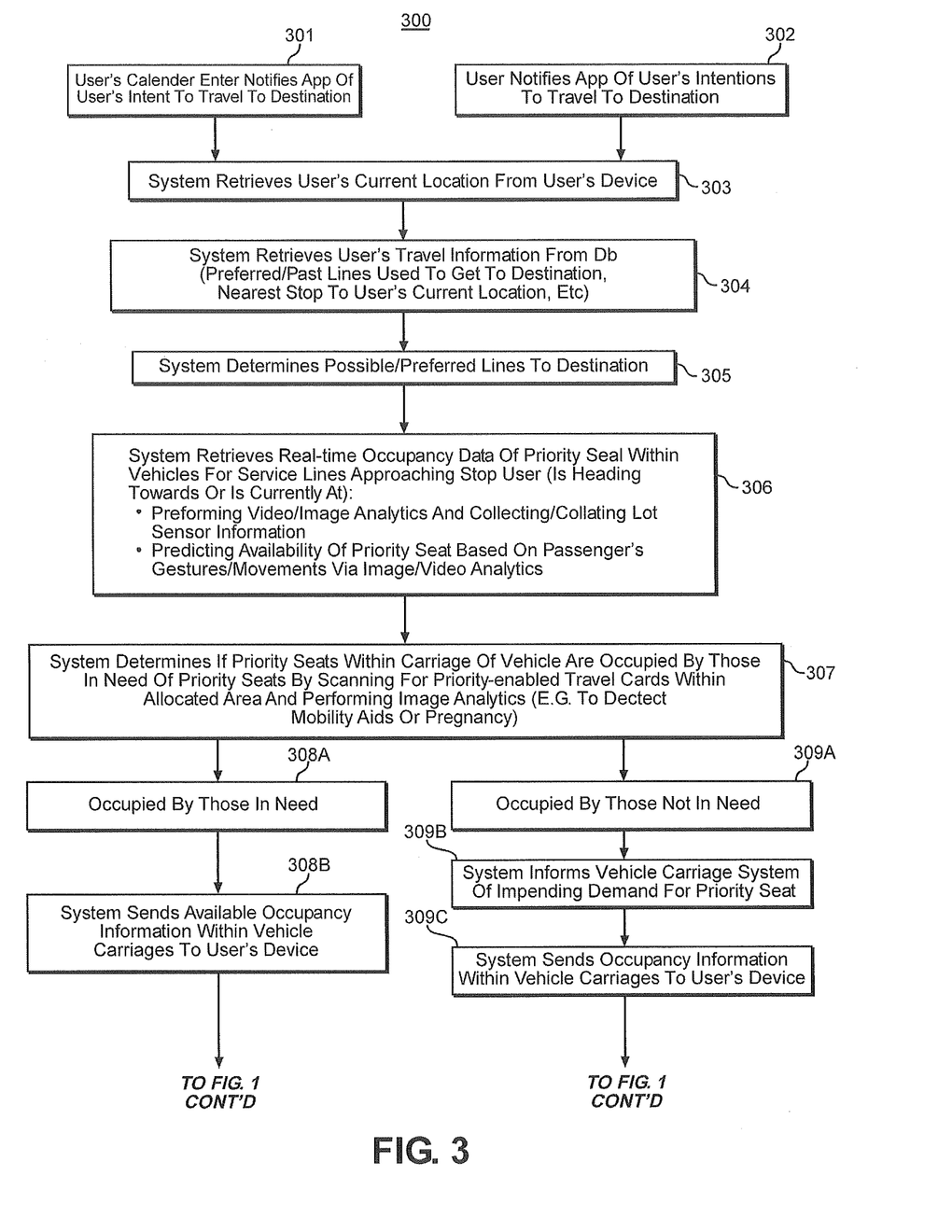
FIG. 3 exemplarily shows a high-level flow chart for another embodiment of the priority seating management method 100.

Referring now to FIG. 3, FIG. 3 exemplarily depicts an application 300 and a flow chart of the system processes of the application 300 of another embodiment of the method 100.

In 301 and 302, a user's (electronic) calendar entry (i.e., on Microsoft Outlook®, Google Calendar®, etc.) can notify an application 300 of the user's intent to travel to a destination or the user can notify an application 300 of the user's intention to travel to a destination.

In steps 303 to 309, the system performs an analysis based on the user's intention to travel. In step 303, the system retrieves a user's current location from the user's device and in step 304 the system retrieves the user's travel information from a database (e.g., preferred/past lines used to get to the destination, nearest stop to user's current location, etc.). In step 305, the system determines a possible/preferred lines to the destination. Thus, in one embodiment, the system may "learn" which line, car, seat, etc. a particular user favors.

Then, in step 306, the system retrieves real-time occupancy data of a priority seat within vehicles for the service lines that are approaching stop user (e.g., public transportation that the user can use) by performing video/image analytics and collecting or collating IoT-sensor information of the seats or vehicles to predict and/or determine the availability of the priority seat based on the seat passenger's gestures, movements, video analytics, etc.

In step 307, the system determines if the priority seat within the public transportation vehicle is occupied by a user in need of the priority seat (e.g., if a disabled user is occupying the seat) by scanning for priority-enabled travel cards, performing imaging analytics, determining if the current occupant also used the application 300, etc.

If the priority seat is determined to be occupied by a disabled user (e.g., a user that needs the seat) in step 308a, the system sends available occupancy information within the vehicle to the user's device, step 308b (e.g., if another seat is open) which allows the user in 308c to reserve a different available priority seat. In 308d, the system reserves the priority seat for the user if the user requests the reservation.

If the priority seat is determined to be occupied by an able-bodied user (e.g., a user who does not require the priority seat) in step 309a, the system sends a notification to the current occupant for the current occupant to vacate the seat in step 309b. The system then sends occupancy information back to the user's device 309 and the user can choose to reserve the priority seat that is occupied by the able-bodied user in step 309d. If the user reserves the occupied seat, the system reserves the seat in step 309e and requests the current occupant vacate the seat by the next stop to make way for the disabled user in step 309f.

In step 310, the system sends information to the user's device including a confirmation of the reservation, time of arrival of the train, where to board the vehicle, where the priority seat is located, etc.

In step 311 and step 312, based on the user boarding the vehicle and taking their priority seat, the occupied seat information is updated in real-time.

Thus, the method 100 and system 400 can optimize priority seating occupancy by advising passengers on location and availability of priority seats, determining if a priority seat is occupied by a special needs passenger (or a special needs passenger having a priority higher than the requesting special needs passenger) and advise accordingly, and predict priority seat vacancy to advise passengers accordingly. Therefore, priority seats can be optimally assigned to passengers who require the priority seat.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
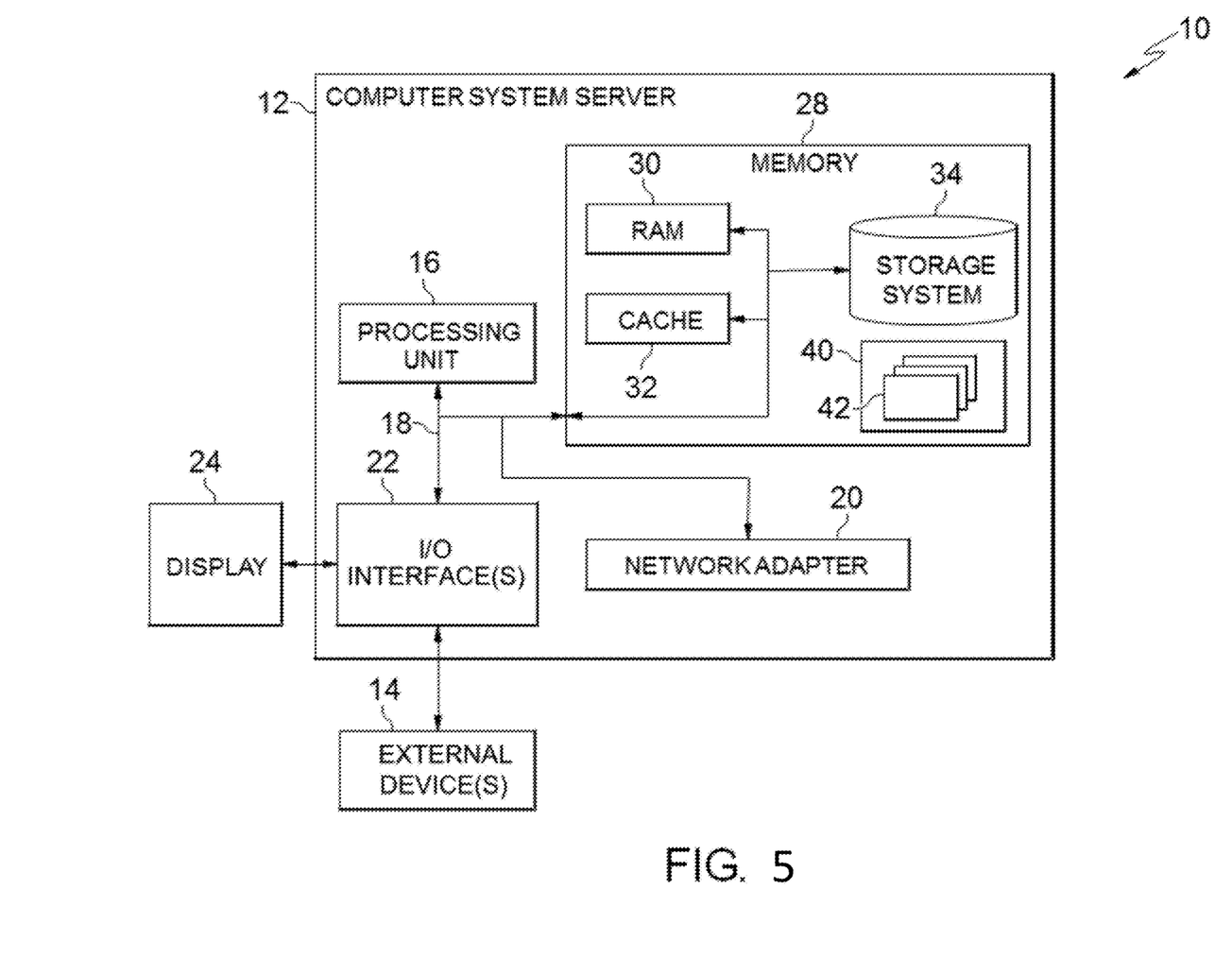
FIG. 5 depicts a cloud-computing node 10 according to an embodiment of the present invention.

Referring now to FIG. 5, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 5, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 6:
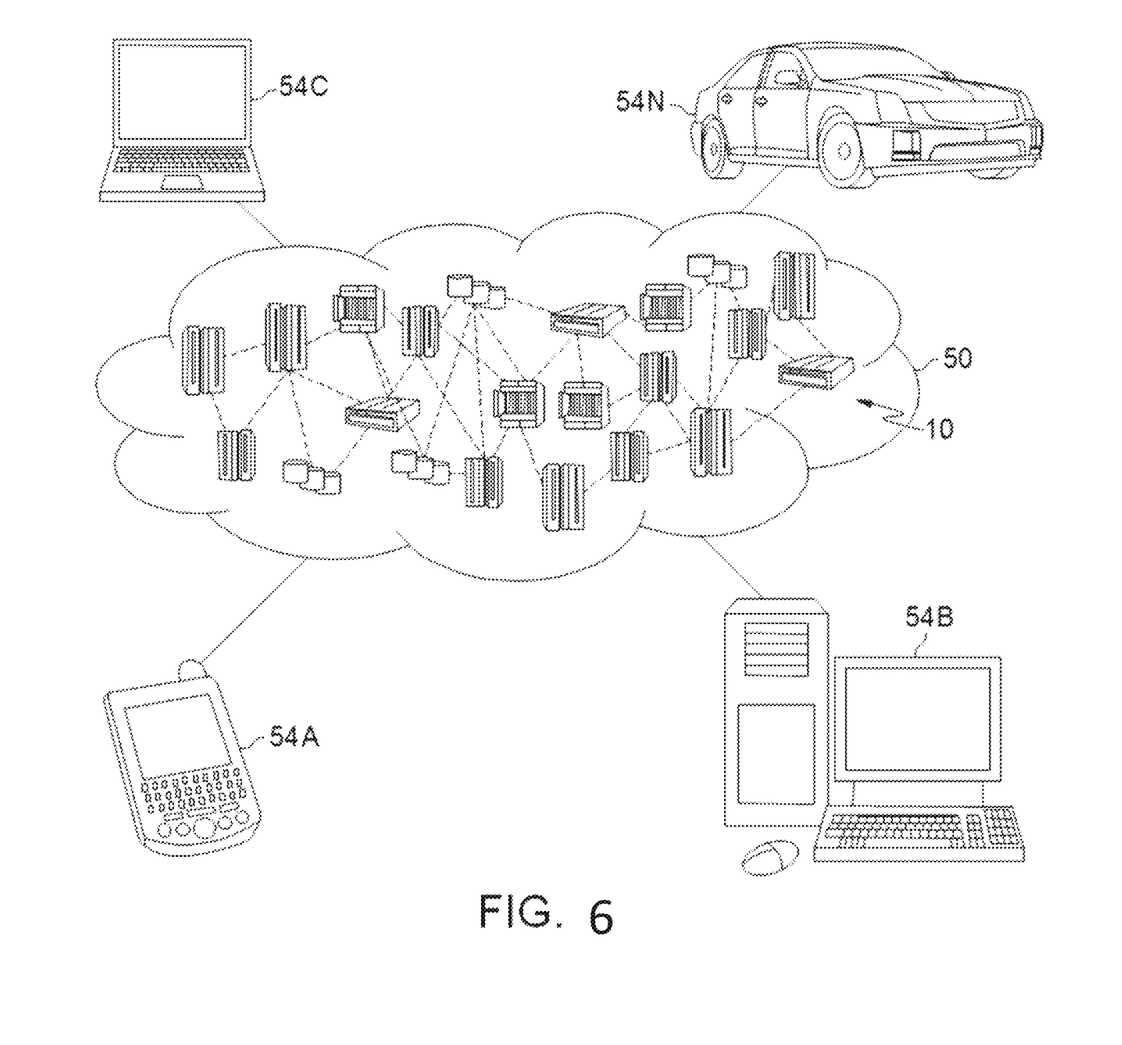
FIG. 6 depicts a cloud-computing environment 50 according to an embodiment of the present invention.

Referring now to FIG. 6, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 6 are intended to be illustrative only and that computing nodes 10 and cloud computing environment 50 can communicate with any type of computerized circuit over any type of network and/or network addressable connection (e.g., using a web browser).

Figure 7:
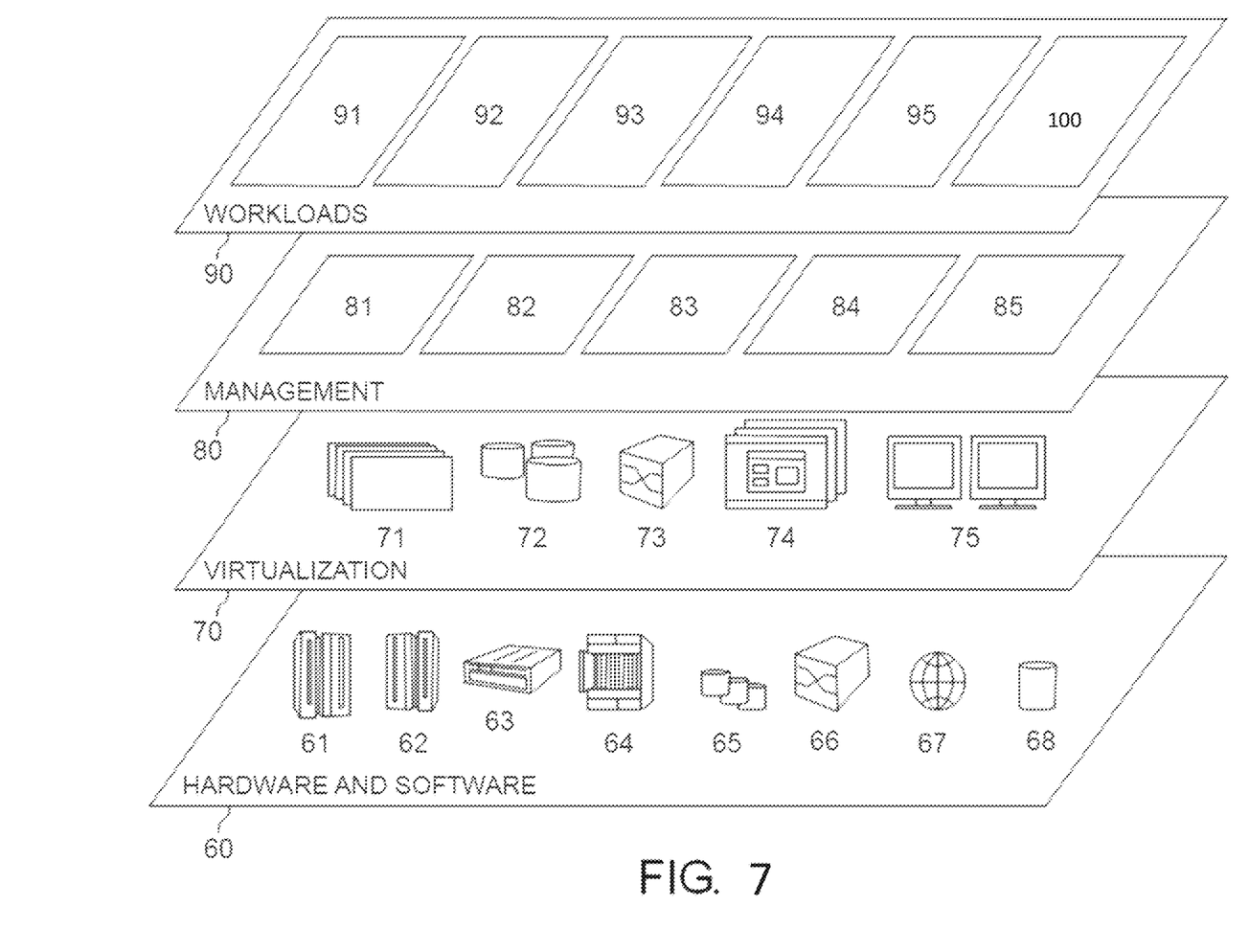
FIG. 7 depicts abstraction model layers according to an embodiment of the present invention.

Referring now to FIG. 6, an exemplary set of functional abstraction layers provided by cloud computing environment 50 (FIG. 7) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and priority seating management method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented priority seating management method that interacts with a cloud computing environment server, the method comprising:
   obtaining trip data including a current location, a priority seat requirement, and a trip destination for a trip;
   retrieving potential route data from a transportation database for each transportation vehicle traveling a route between the current location and the trip destination;
   retrieving real-time priority seating occupancy information for each transportation vehicle, via image analytics of an image of an inside of each transportation vehicle and a sensor from each transportation vehicle, traveling the route including a location of a priority seat and an occupancy type of the priority seat;
   augmenting the real-time priority seating occupancy information to obtain a predicted vacancy of the priority seats at each stop in the route, prior to stopping at each stop, based on the image analytics;
compiling the trip data, the potential route data, and the real-time priority seating occupancy information to determine a status availability of the priority seat; and
outputting, via a cloud on-demand self-service running on an application on a graphical-user interface that communicates with the cloud computing environment, the status availability to the application on a device that is interactive,
wherein the transportation vehicle comprises multiple cabins each of which has its own entrance,
wherein the location of the priority seat is in less than all of the multiple cabins, and
wherein the real-time priority seating occupancy information retrieval is further performed by collating Internet-of-Things (IoT) sensor information from IoT sensors within the seats to further optimize the predicted vacancy of the priority seats,
wherein the cloud computing environment comprises a cloud computing model of a service delivery comprising two or more clouds of a private cloud, a community cloud, and a public cloud that remain unique entities but are bound together by technology that enables data and application portability that results in load-balancing between the two or more clouds,
further comprising, based on the augmented real-time priority seating occupancy information, alerting a current occupant to vacate the priority seat if the status availability is determined to be that the occupancy type of the priority seat includes either an able-bodied occupant of the priority seat or a lower priority special needs passenger than that of the priority seat requirement.

2. The computer-implemented method of claim 1, further comprising, based on the augmented real-time priority seating occupancy information, alerting a current occupant to vacate the priority seat if the status availability is determined to be that the occupancy type of the priority seat includes either an able-bodied occupant of the priority seat or a lower priority special needs passenger than that of the priority seat requirement.

3. The computer-implemented method of claim 2, further comprising, based on the augmented real-time priority seating occupancy information, reserving the priority seat if the alerting alerts the able-bodied occupant to vacate the priority seat.

4. The computer-implemented method of claim 1, wherein the status availability of the priority seat is determined to be occupied if the occupancy type indicates a disabled user occupying the seat.

5. The computer-implemented method of claim 1, further comprising, based on the augmented real-time priority seating occupancy information, reserving the priority seat if the status availability of the priority seat is determined to be unoccupied.

6. The computer-implemented method of claim 1, further comprising, based on the augmented real-time priority seating occupancy information, reserving the priority seat if the status availability of the priority seat predicts that a trip destination for a current occupant is the current location of the trip data.

7. The computer-implemented method of claim 1, further comprising, based on the augmented real-time priority seating occupancy information, reserving the priority seat for the trip when the status availability for the priority seat is determined to be open, and
wherein a confirmation is sent for the trip of the reservation including a location of the priority seat on the transportation vehicle.

8. The computer-implemented method of claim 1, further comprising, based on the augmented real-time priority seating occupancy information, reserving the priority seat for the trip when the status availability for the priority seat is determined to be open, and
wherein a confirmation is sent for the trip of the reservation including an entry point nearest to the priority seat on the transportation vehicle.

9. The computer-implemented method of claim 1,
wherein the status availability of the priority seat is determined to be occupied if the occupancy type indicates a disabled user occupying the seat,
further comprising:
based on the augmented real-time priority seating occupancy information, reserving the priority seat if the status availability of the priority seat is determined to be unoccupied; and
based on the augmented real-time priority seating occupancy information, reserving the priority seat if the status availability of the priority seat predicts that a trip destination for a current occupant is the current location of the trip data.

10. A computer program product for priority seating management that interacts with a cloud computing environment server, the computer program product comprising a computer readable storage medium having program instructions embodied therewith, the program instructions executable by a computer to cause the computer to perform:
obtaining trip data including a current location, a priority seat requirement, and a trip destination for a trip;
retrieving potential route data from a transportation database for each transportation vehicle traveling a route between the current location and the trip destination;
retrieving real-time priority seating occupancy information for each transportation vehicle, via image analytics of an image of an inside of each transportation vehicle and a sensor from each transportation vehicle, traveling the route including a location of a priority seat and an occupancy type of the priority seat;
augmenting the real-time priority seating occupancy information to obtain a predicted vacancy of the priority seats at each stop in the route, prior to stopping at each stop, based on the image analytics;
compiling the trip data, the potential route data, and the real-time priority seating occupancy information to determine a status availability of the priority seat; and
outputting, via a cloud on-demand self-service running on an application on a graphical-user interface that communicates with the cloud computing environment, the status availability to the application on a device that is interactive,
wherein the transportation vehicle comprises multiple cabins each of which has its own entrance,
wherein the location of the priority seat is in less than all of the multiple cabins, and
wherein the real-time priority seating occupancy information retrieval is further performed by collating Internet-of-Things (IoT) sensor information from IoT sensors within the seats to further optimize the predicted vacancy of the priority seats,
wherein the cloud computing environment comprises a cloud computing model of a service delivery comprising two or more clouds of a private cloud, a community cloud, and a public cloud that remain unique entities but are bound together by technology that enables data and application portability that results in load-balancing between the two or more clouds, further comprising, based on the augmented real-time priority seating occupancy information, alerting a current occupant to vacate the priority seat if the status availability is determined to be that the occupancy type of the priority seat includes either an able-bodied occupant of the priority seat or a lower priority special needs passenger than that of the priority seat requirement.

11. The computer program product of claim 10, further comprising, based on the augmented real-time priority seating occupancy information, alerting a current occupant to vacate the priority seat if the status availability is determined to be that the occupancy type of the priority seat includes either an able-bodied occupant of the priority seat or a lower priority special needs passenger than that of the priority seat requirement.

12. The computer program product of claim 11, further comprising, based on the augmented real-time priority seating occupancy information, reserving the priority seat if the alerting alerts the able-bodied occupant to vacate the priority seat.

13. The computer program product of claim 10, wherein the status availability of the priority seat is determined to be occupied if the occupancy type indicates a disabled user occupying the seat.

14. The computer program product of claim 10, further comprising, based on the augmented real-time priority seating occupancy information, reserving the priority seat if the status availability of the priority seat is determined to be unoccupied.

15. The computer program product of claim 10, further comprising, based on the augmented real-time priority seating occupancy information, reserving the priority seat if the status availability of the priority seat predicts that a trip destination for a current occupant is the current location of the trip data.

16. The computer program product of claim 10, further comprising, based on the augmented real-time priority seating occupancy information, reserving the priority seat for the trip when the status availability for the priority seat is determined to be open, and
wherein a confirmation is sent for the trip of the reservation including a location of the priority seat on the transportation vehicle.

17. The computer program product of claim 10, further comprising, based on the augmented real-time priority seating occupancy information, reserving the priority seat for the trip when the status availability for the priority seat is determined to be open, and
wherein a confirmation is sent for the trip of the reservation including an entry point nearest to the priority seat on the transportation vehicle.

18. A priority seating management system that interacts with a cloud computing environment server, said system comprising:
a processor; and
a memory, the memory storing instructions to cause the processor to perform:
obtaining trip data including a current location, a priority seat requirement, and a trip destination for a trip;
retrieving potential route data from a transportation database for each transportation vehicle traveling a route between the current location and the trip destination;
retrieving real-time priority seating occupancy information for each transportation vehicle, via image analytics of an image of an inside of each transportation vehicle and a sensor from each transportation vehicle, traveling the route including a location of a priority seat and an occupancy type of the priority seat;
augmenting the real-time priority seating occupancy information to obtain a predicted vacancy of the priority seats at each stop in the route, prior to stopping at each stop, based on the image analytics;
compiling the trip data, the potential route data, and the real-time priority seating occupancy information to determine a status availability of the priority seat; and
outputting, via a cloud on-demand self-service running on an application on a graphical-user interface that communicates with the cloud computing environment, the status availability to the application on a device that is interactive,
wherein the transportation vehicle comprises multiple cabins each of which has its own entrance,
wherein the location of the priority seat is in less than all of the multiple cabins, and
wherein the real-time priority seating occupancy information retrieval is further performed by collating Internet-of-Things (IoT) sensor information from IoT sensors within the seats to further optimize the predicted vacancy of the priority seats,
wherein the cloud computing environment comprises a cloud computing model of a service delivery comprising two or more clouds of a private cloud, a community cloud, and a public cloud that remain unique entities but are bound together by technology that enables data and application portability that results in load-balancing between the two or more clouds,
further comprising, based on the augmented real-time priority seating occupancy information, alerting a current occupant to vacate the priority seat if the status availability is determined to be that the occupancy type of the priority seat includes either an able-bodied occupant of the priority seat or a lower priority special needs passenger than that of the priority seat requirement.

19. The system of claim 18, wherein the memory further stores instructions to cause the processor to perform, based on the augmented real-time priority seating occupancy information:
alerting a current occupant to vacate the priority seat if the status availability is determined to be that the occupancy type of the priority seat includes either an able-bodied occupant of the priority seat or a lower priority special needs passenger than that of the priority seat requirement.

* * * * *